March 1, 1960
E. LALONDE
2,926,677
TENT ATTACHMENT FOR AUTOMOBILES
Filed Jan. 3, 1958
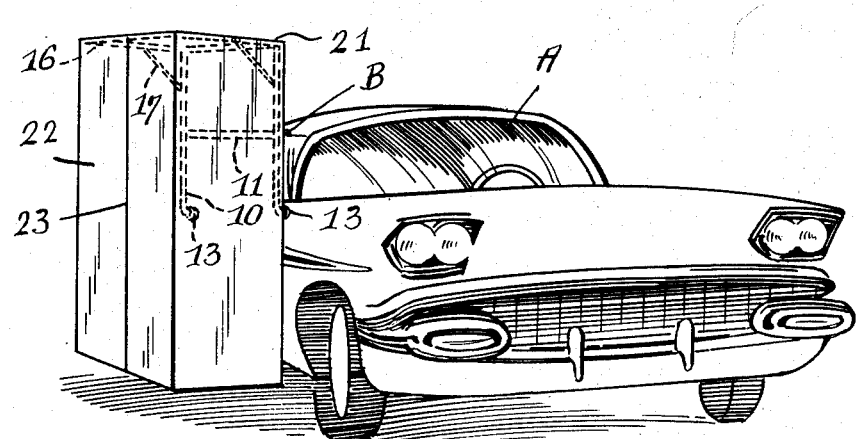
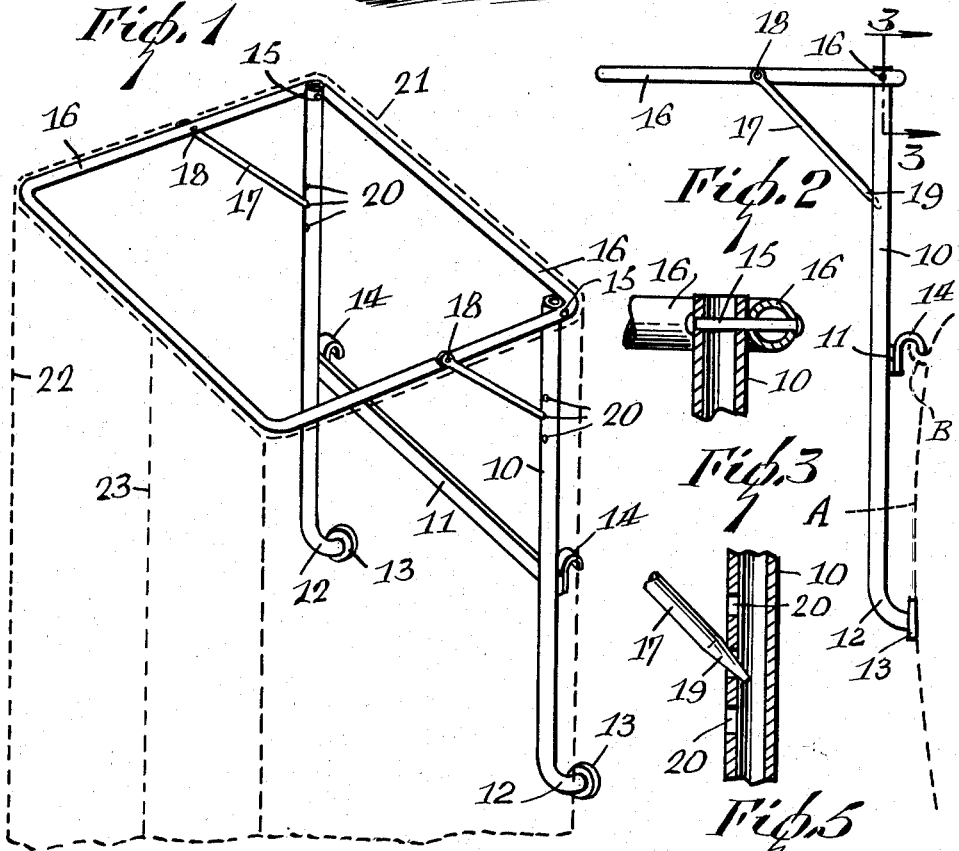
Inventor:
Euclide Lalonde
By
Attorney

United States Patent Office 2,926,677
Patented Mar. 1, 1960

2,926,677

TENT ATTACHMENT FOR AUTOMOBILES

Euclide Lalonde, Coaticook, Quebec, Canada

Application January 3, 1958, Serial No. 707,042

1 Claim. (Cl. 135—4)

This invention relates to tents for use on bathing beaches and the like and has special reference to a tent attachment for automobiles.

One important object of this invention is to provide a novel supporting frame for a tent of this character.

A second important object of the invention is to provide a foldable tent frame having a novel construction which permits the frame to be safely supported at a side of an automobile without the use of bolts or screws and without requiring any change in the form and construction of the automobile.

A third important object of the invention is to provide a novel structure of this character so arranged to an automobile, a person using the tent will be entirely hidden from other persons in the vicinity.

With the above and other objects in view, as will be presently apparent, the invention consists in general of certain novel features of construction and combinations of parts hereinafter fully described, illustrated in the accompanying drawings and particularly claimed.

In the drawings like characters of reference indicate like parts in the several views, and:

Figure 1 is a perspective view of an automobile having the invention set up on its right side and ready for occupancy;

Figure 2 is a side elevation of the frame of this invention in its relation to an automobile;

Figure 3 is an enlarged section on the line 3—3 of Figure 2;

Figure 4 is a perspective view of the frame of this invention with the cover sheet indicated by broken lines; and Figure 5 is a section on the line 5—5 of Figure 4.

This invention has a frame which includes two principal parts one of which extends vertically and the other of which extends horizontally when the tent is set up.

The vertical part of the frame forms a support which includes a pair of upright parallel sides 10 held in spaced relation by a cross bar 11. The uprights 10 have their lower ends bent to provide a right angled portion 12 extending toward an automobile A. Each of the portions 12 carries a cup 13 which rests against a side of the automobile body as in Figure 2. These cups are preferably of some material such as rubber to avoid marring the paint work of the car. Also these cups may be formed as suction cups the better to hold the lower ends of the uprights securely in place. Each upright is provided with a downwardly opening hook 14 adapted to engage in the gutter or other upstanding edge portion B of the automobile body and thus hold the vertical frame in proper position along the side of the car. A pivot bolt 15 extends through the upper end of each upright 10.

The horizontal portion of the frame which forms a tent hanger frame consists of a rectangular bent pipe 16 one side of which is mounted on the pivot bolts 15 so that, for transportation or storage it may swing down as easily understandable. Struts 17 each have one end pivoted to the frame 16 as at 18. The free end 19 of each strut is pointed to enable it to and a selected hole of a row of holes 20 formed in each upright 10. By this arrangement the frame 16 may always be adjusted to horizontal position even though the uprights 10 may be inclined from or towards the automobile.

When the frame is set up it is covered by a cloth cut and sewed to make a top 21 and depending sides 22 arranged to provide an access slit 23.

Obviously for storage the cover sheet is removed, the struts loosened and the frame 16 dropped down after which the frame may be unhooked from the car's gutter B, and wrapped in the cover sheet.

Although a specific embodiment of the invention has been illustrated and described, it will be understood that various alterations in the details of construction may be made without departing from the scope of the invention as indicated by the appended claim.

What I claim is:

For attachment to an automobile having a side, and a rain gutter extending along the upper edge of said side, a support adapted to be vertically disposed along the automobile side and consisting of a pair of upright parallel spaced uprights and of a cross bar rigidly securing said uprights intermediate their ends, the lower ends of said uprights being bent at substantially right angle and having means for resting against the side of the automobile body, hooks secured to said uprights at the level of said cross bar to engage said rain gutter, a rectangular tent hanger frame, pivotally connected along one side to the upper ends of said pair of uprights for pivotal movement of said tent hanger frame between a substantially horizontally extending erected position and a folded position flat against said pair of uprights, a tent suspended from said hanger frame and strut members each having one end pivoted to said hanger frame and having a pointed free end, said uprights having a plurality of spaced holes made therein and adapted to selectively receive the pointed ends of said strut members in order to support said hanger frame at an adjusted angle from said uprights.

References Cited in the file of this patent

UNITED STATES PATENTS

| | | |
|---|---|---|
| 2,027,551 | Rideout | Jan. 14, 1936 |
| 2,770,244 | Carson | Nov. 13, 1956 |
| 2,829,661 | Crot | Apr. 8, 1958 |
| 2,840,091 | D'Azzo | June 24, 1958 |

FOREIGN PATENTS

| | | |
|---|---|---|
| 1,094,137 | France | May 13, 1955 |